(12) United States Patent
Mengerink

(10) Patent No.: US 7,587,367 B2
(45) Date of Patent: Sep. 8, 2009

(54) METHOD AND SYSTEM TO PROVIDE FEEDBACK DATA WITHIN A DISTRIBUTED E-COMMERCE SYSTEM

(75) Inventor: Matthew Mengerink, San Jose, CA (US)

(73) Assignee: eBay Inc., San Jose, CA (US)

( * ) Notice: Subject to any disclaimer, the term of this patent is extended or adjusted under 35 U.S.C. 154(b) by 785 days.

(21) Appl. No.: 11/027,713

(22) Filed: Dec. 31, 2004

(65) Prior Publication Data

US 2006/0149745 A1    Jul. 6, 2006

(51) Int. Cl.
*H04K 1/00* (2006.01)
*H04L 9/00* (2006.01)
*G06Q 20/00* (2006.01)
*G06Q 40/00* (2006.01)

(52) U.S. Cl. .............................. 705/64; 705/16; 705/39
(58) Field of Classification Search .................... 705/64
See application file for complete search history.

(56) References Cited

U.S. PATENT DOCUMENTS

| 6,102,287 A * | 8/2000 | Matyas, Jr. ................... 235/380 |
| 2006/0031177 A1 * | 2/2006 | Rule ........................... 705/80 |

* cited by examiner

*Primary Examiner*—Calvin L Hewitt, II
*Assistant Examiner*—Nancy T Le
(74) *Attorney, Agent, or Firm*—Schwegman, Lundberg & Woessner, P.A.

(57) ABSTRACT

A system and method to provide feedback data within a distributed feedback system of an e-commerce system. Feedback data describing e-commerce transactions are generated by buyers of goods and services and the corresponding sellers of these goods and services. The feedback data is stored and maintained within a set of feedback servers organized into a peer-to-peer network of distributed devices. The feedback data is organized into groupings of feedback data that are stored onto database storage associated with each of the P2P network nodes. Buyers and sellers may search the feedback data from these distributed data sources to obtain reputation data associated with parties with which they propose to enter into new transactions for goods and services.

26 Claims, 11 Drawing Sheets

| | | | | |
|---|---|---|---|---|
| SELLER ID 1 811A | BUYER ID 1 812A | TRANSACTION ID 1 813A | TRANSACTION FEEDBACK RATING 1 814A | TRANSACTION FEEDBACK COMMENTS 1 815A |
| SELLER ID 2 811B | BUYER ID 1 812B | TRANSACTION ID 2 813B | TRANSACTION FEEDBACK RATING 2 814B | TRANSACTION FEEDBACK COMMENTS 2 815B |
| SELLER ID 1 811C | BUYER ID 2 812C | TRANSACTION ID 3 813C | TRANSACTION FEEDBACK RATING 3 814C | TRANSACTION FEEDBACK COMMENTS 3 815C |
| SELLER ID 3 811D | BUYER ID 3 812D | TRANSACTION ID 4 813D | TRANSACTION FEEDBACK RATING 4 814D | TRANSACTION FEEDBACK COMMENTS 4 815D |
| SELLER ID 1 811E | BUYER ID 4 812E | TRANSACTION ID 5 813E | TRANSACTION FEEDBACK RATING 5 814E | TRANSACTION FEEDBACK COMMENTS 5 815E |

Rows labeled: 802A, 802B, 802C, 802D, 802E. Table 801.

FIG. 8

METHOD AND SYSTEM TO PROVIDE FEEDBACK DATA WITHIN A DISTRIBUTED E-COMMERCE SYSTEM

FIELD OF THE INVENTION

Embodiments of the present invention relate generally to the technical field of commerce automation and, in one exemplary embodiment, to methods and systems to provide feedback data within a distributed e-commerce system.

BACKGROUND

Electronic commerce that utilizes the Internet to sell goods and services to customers has been increasing in its scope and scale at increasing rates. One of the main limitations on this form of commerce is the lack of direct interaction between buyers and sellers that is present in most face-to-face transactions. Merchants and other sellers of goods and services have been hindered at times by an inability to identify trustworthy buyers who electronically request to purchase items while providing credit card or other payment information as well as a shipping address. Similarly, buyers may be hesitant to purchase items from a merchant who may only be found using an anonymous web site.

To address these problems, some e-commerce web sites have provided rating mechanisms in which buyers and sellers may provide ratings and/or feedback providing a mechanism for both good and bad experiences of prior transactions to serve as a form of reputation data for both buyers and sellers. These rating mechanisms may be part of an integrated e-commerce system, such as an on-line auction web site, in which parties to the transactions may providing ratings and comments regarding the other party to the transaction. These rating mechanisms may also be part of a review and rating system in which customers of web sites are asked to provide feedback as part of an on-line survey once a transaction has been completed.

These rating mechanisms typically collect large numbers of rating data records from the parties to the transactions that are accumulated within a large database of feedback data. The records may be searched by subsequent buyers and sellers to determine if a future transaction involving the other party may be advisable. In order for the search results obtained by subsequent buyers and sellers to be meaningful, large amounts of feedback data must be obtained, maintained, and processed as a reputation of a seller, for example, may best be seen in the large number of satisfied customers even when a few dissatisfied customers may also provide feedback. In addition, a seller may receive feedback indicating that a problem was quickly addressed that may provide useful data to subsequent buyers.

All of this feedback data creates a large database that must be on-line and available for users if the data is to be useful. Providing computational resources for this large database, both in terms of storage capacity as well as computational processing of database requests, may limit the ability of some merchants and on-line e-commerce services to provide these rating mechanisms. Large centralized databases that provide 24/7 availability are typically complex and expensive to operate. As such, alternate mechanisms for providing these rating mechanisms without utilizing a large centralized database may overcome these limitations in existing systems.

These limitations of existing commerce systems limit the effectiveness of these systems to buyers and sellers. New mechanisms to connect interested buyers and sellers who use these commerce systems may address these limitations and thus increase on-line sales and corresponding profits for these sellers and commerce system operators.

SUMMARY

The below described embodiments of the present invention are directed to methods and systems to provide buyers and sellers feedback rating data from a distributed feedback system within an e-commerce system. According to one embodiment, there is provided a system for providing feedback data to users within an e-commerce system. The system has a peer-to-peer network of feedback servers, a consortium server for maintaining the anti-fraud module and for maintaining the topography of the peer-to-peer network and its corresponding organization of the set of feedback data records; and a plurality of user nodes connecting to the feedback servers to generate search query requests and requests to add feedback data records to the feedback data database. The feedback servers include a feedback data database for storing a portion of a set of feedback data records, a feedback map database for storing a topography of the peer-to-peer network and its corresponding organization of the set of feedback data records; and a distributed feedback anti-fraud module for applying an anti-fraud model to determine whether proposed feedback data records may be added to the set of feedback data records.

In another embodiment, there is provided a method for providing feedback data within an e-commerce system. The method receives a search query request for feedback data from a user, locates one or more feedback servers within a peer-to-peer network of feedback servers to process the request, forwards the search query request to the one or more feedback servers, generates a response to the search query request, and returns a response to the search query request to the user.

In yet another embodiment, there is provided a system for providing a feedback data within an e-commerce system. The system includes a means for receiving a search query request for feedback data from a user, a means for locating one or more feedback servers within a peer-to-peer network of feedback servers to process the request, a means for forwarding the search query request to the one or more feedback servers, a means for generating a response to the search query request, and a means for returning a response to the search query request to the user.

In yet another embodiment, there is provided a machine-readable medium storing a set on instructions that, when executed by a machine, cause of the machine to perform a method for providing feedback data within an e-commerce system. The method receives a search query request for feedback data from a user, locates one or more feedback servers within a peer-to-peer network of feedback servers to process the request, forwards the search query request to the one or more feedback servers, generates a response to the search query request, and returns a response to the search query request to the user.

The details of one or more embodiments of the invention are set forth in the accompanying drawings and the description below. Other features, objects, and advantages of the invention will be apparent from the description and drawings, and from the claims.

BRIEF DESCRIPTION OF THE DRAWINGS

FIG. 8 is a block diagram of a feedback data database consisting of a collection of feedback data records according to an exemplary embodiment of the present invention.

DETAILED DESCRIPTION

A method and system to provide feedback data from a distributed feedback system within an e-commerce system are described. In the following description, for purposes of explanation, numerous specific details are set forth in order to provide a thorough understanding of the present invention. It will be evident, however, to one skilled in the art that the present invention may be practiced without these specific details.

Figure 1:
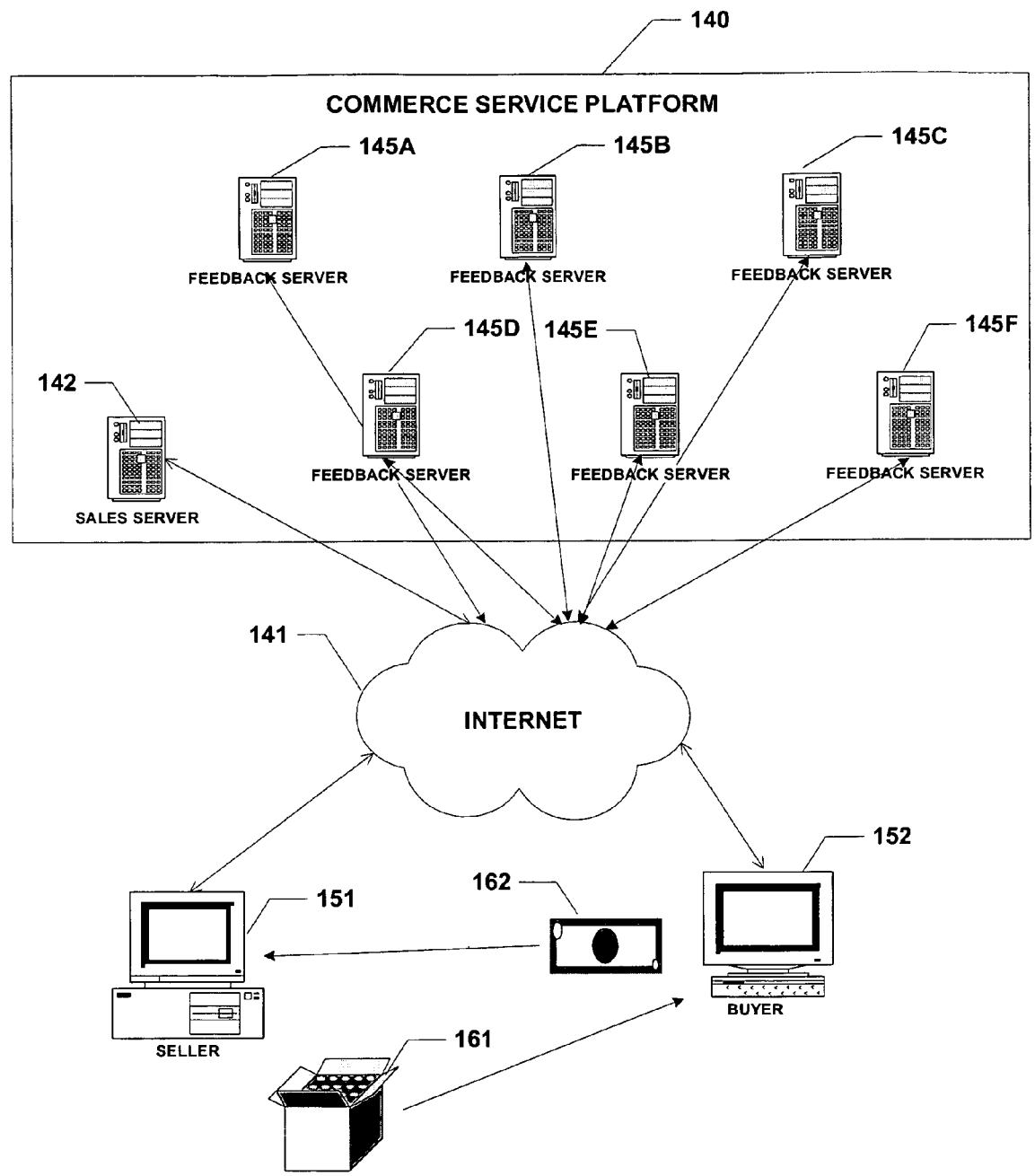
FIG. 1 is a network diagram depicting a system having a client-server architecture for an e-commerce system having a distributed feedback system in accordance with one exemplary embodiment of the present invention.

FIG. 1 is a network diagram depicting a system having a client-server architecture for an e-commerce system having a distributed feedback system in accordance with one exemplary embodiment of the present invention. A seller 151 offers goods or services 161 for sale by posting a listing 145 for these items 161 on a sales server 142. The sales server 142 is part of a larger commerce service platform 140. An interested buyer 152 searches sales server 142 to locate listing 145 and responds to the listing in an attempt to purchase goods 161 from seller 151. If listing 145 corresponds to an on-line auction for goods 161, buyer 152 makes a bid on these goods. If listing 145 permits an item to be purchase immediately for a fixed price, buyer 152 may complete the transaction by offering the fixed price.

Once the transaction is consummated, buyer 152 sends payment 162 to seller 151 and seller 151 ships the goods 161 to buyer 152. Payment 162 may be made using on-line payment services, using credit card payments, and using traditional payment mechanisms of checks, payment orders and cash that are sent using a postal service.

Upon completion of this transaction, buyer 152 and/or seller 151 may wish to provide feedback within the commerce service platform 140 for use by subsequent buyers and sellers. This feedback typically consists of a feedback data record identifying the buyer, seller, and the transaction in question, as well as a rating value with comments describing the transaction. The rating value may indicate a positive value to indicate a good transaction experience, a negative value to indicate a bad transaction experience, and a neutral value to indicate a non-trouble-free transaction experience. Other rating scales having a larger range of values may also be used if desired.

The comments portion of the feedback data record may be used to amplify and/or clarify a particular rating. For example, a buyer may provide a neutral rating value if a problem existed with the item sold by the seller but may wish to provide a detailed comment indicating how the seller addressed the problem. Similarly, the comment may provide a buyer and a seller information that while the transaction was successfully completed, the other party may be slow to respond with payment and shipment of the item. All of this feedback data may be useful to parties to a subsequent transaction involving the buyer and seller.

In the exemplary embodiment, the feedback data records are maintained within a set of feedback servers 145A-145F. Portions of the feedback data database are maintained on each of the feedback servers 145A-145F. Individual feedback data records are maintained on a plurality of different one of the feedback servers 145A-145F in order to provide redundancy needed to provide a desired level of data availability. Search queries for feedback data on a particular buyer or seller are routed within the network of feedback servers 145A-145F to the server maintaining the feedback data in question. The particular one of feedback servers 145A-145F responds to the search query using data within its portion of the distributed database. Through the distributed nature of the set of feedback servers 145A-145F, response time for large numbers of queries may be reduced as these different servers simultaneously respond to different queries.

When new feedback data is to be added to the distributed database, a request to add a new feedback data record is sent from buyer 152 or seller 151 to commerce server platform 140. The request is routed to the appropriate one of feedback servers 145A-145F for processing. The appropriate one of feedback servers 145A-145F determines if the record may be added to the database after applying a set of anti-fraud checks to verify the validity of the feedback data record. This process may be repeated on every one of the feedback servers 145A-145F that maintains the data for the particular buyer or seller.

Platform Architecture

Figure 2:
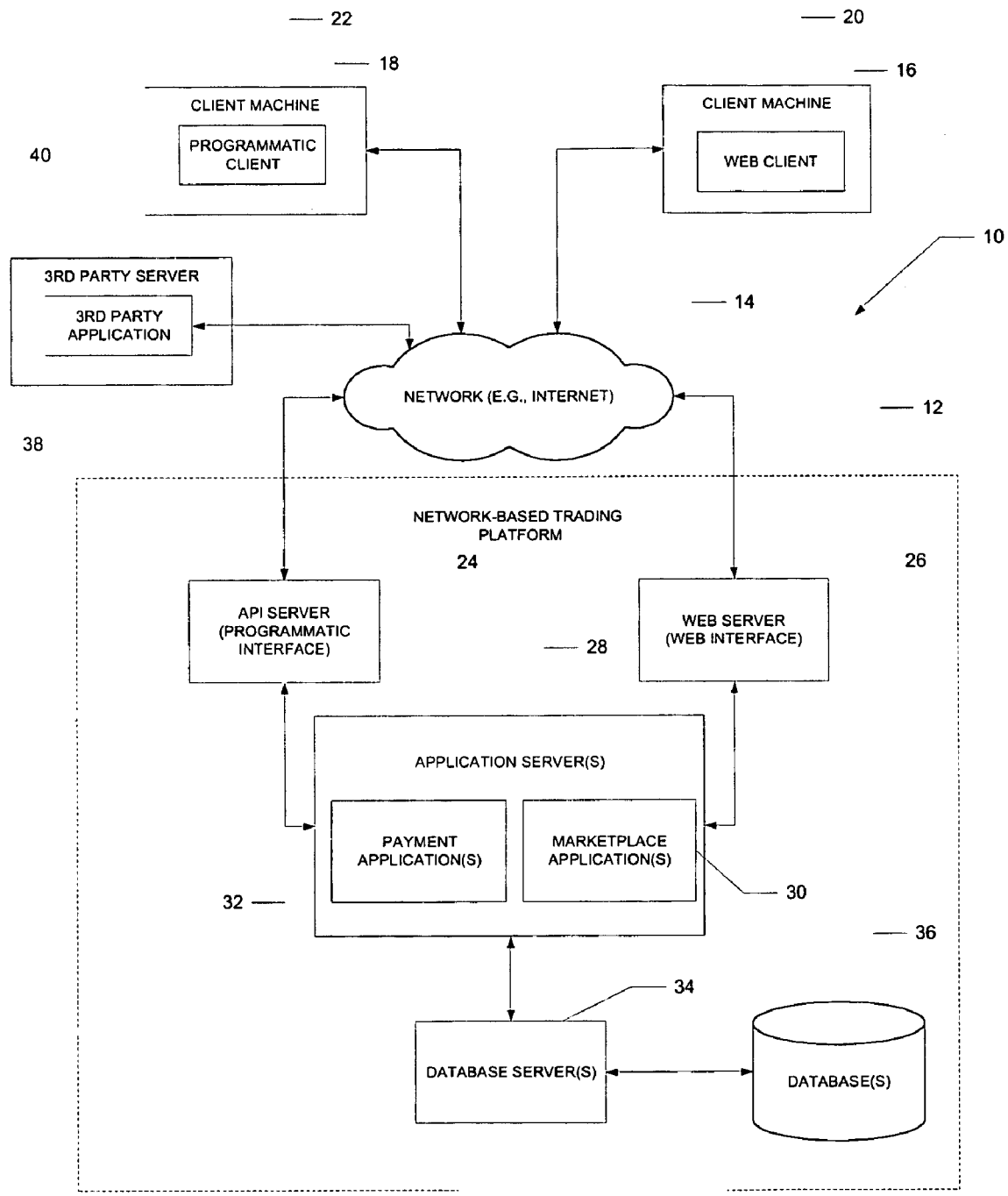
FIG. 2 is a detailed network diagram depicting a system having a client-server architecture in accordance with one exemplary embodiment of the present invention.

FIG. 2 is a network diagram depicting a system 10, according to one exemplary embodiment of the present invention, having a client-server architecture. A commerce server platform, in the exemplary form of a network-based marketplace 12, provides server-side functionality, via a network 14 (e.g., the Internet) to one or more clients. FIG. 2 illustrates, for example, a web client 16 (e.g., a browser, such as the Internet Explorer browser developed by Microsoft Corporation of Redmond, Washington State), and a programmatic client 18 executing on respective client machines 20 and 22.

Turning specifically to the network-based marketplace 12, an Application Program Interface (API) server 24 and a web server 26 are coupled to, and provide programmatic and web interfaces respectively to, one or more application servers 28. The application servers 28 host one or more marketplace applications 30 and payment applications 32. The application servers 28 are, in turn, shown to be coupled to one or more databases servers 34 that facilitate access to one or more databases 36.

The marketplace applications 30 provide a number of marketplace functions and services to users that access the marketplace 12. The payment applications 32 likewise provide a number of payment services and functions to users. The payment applications 32 may allow users to quantify for, and accumulate, value (e.g., in a commercial currency, such as the U.S. dollar, or a proprietary currency, such as "points") in accounts, and then later to redeem the accumulated value for products (e.g., goods or services) that are made available via the marketplace applications 30. While the marketplace and payment applications 30 and 32 are shown in FIG. 2 to both form part of the network-based marketplace 12, it will be appreciated that, in alternative embodiments of the present invention, the payment applications 32 may form part of a payment service that is separate and distinct from the marketplace 12.

Further, while the system 10 shown in FIG. 2 employs a client-server architecture, embodiments of the present invention are of course not limited to such an architecture, and could equally well find application in a distributed, or peer-to-peer, architecture system. The various marketplace and payment applications 30 and 32 could also be implemented as standalone software programs, which do not necessarily have networking capabilities.

The web client 16, it will be appreciated, accesses the various marketplace and payment applications 30 and 32 via the web interface supported by the web server 26. Similarly, the programmatic client 18 accesses the various services and functions provided by the marketplace and payment applications 30 and 32 via the programmatic interface provided by the API server 24. The programmatic client 18 may, for example, be a seller application (e.g., the TurboLister application developed by eBay Inc., of San Jose, Calif.) to enable sellers to author and manage listings on the marketplace 12 in an off-line manner, and to perform batch-mode communications between the programmatic client 18 and the network-based marketplace 12.

FIG. 2 also illustrates a third party application 38, executing on a third party server machine 40, as having programmatic access to the network-based marketplace 12 via the programmatic interface provided by the API server 24. For example, the third party application 38 may, utilizing information retrieved from the network-based marketplace 12, support one or more features or functions on a website hosted by the third party. The third party website may, for example, provide one or more promotional, marketplace or payment functions that are supported by the relevant applications of the network-based marketplace 12.

Marketplace Applications

Figure 3:
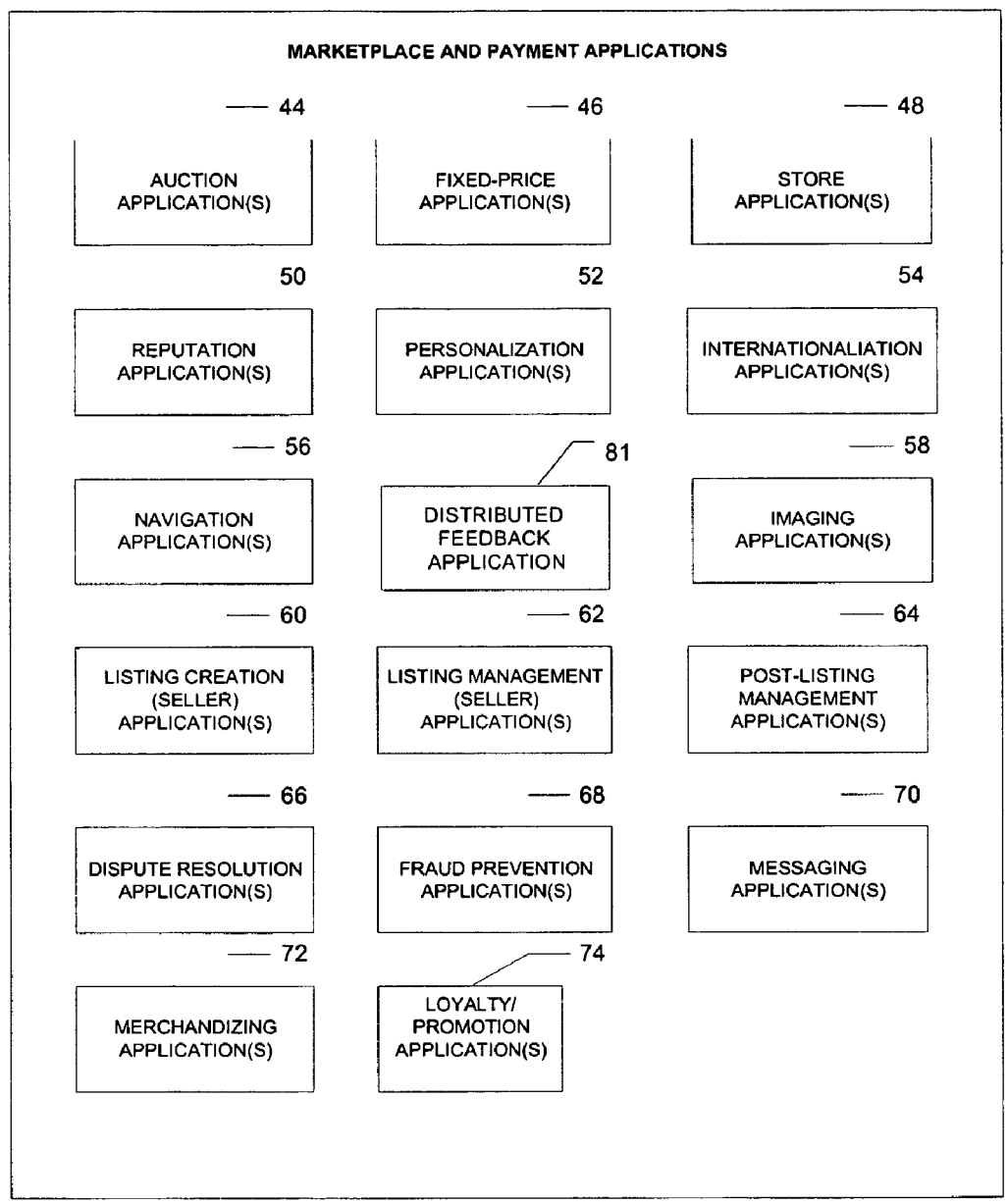
FIG. 3 is a block diagram illustrating multiple marketplace and payment applications in one exemplary embodiment of the present invention.

FIG. 3 is a block diagram illustrating multiple marketplace and payment applications 30 that, in one exemplary embodiment of the present invention, are provided as part of the network-based marketplace 12. The marketplace 12 may provide a number of listing and price-setting mechanisms whereby a seller may list goods or services for sale, a buyer can express interest in or indicate a desire to purchase such goods or services, and a price can be set for a transaction pertaining to the goods or services. To this end, the marketplace applications 30 are shown to include one or more auction applications 44 which support auction-format listing and price setting mechanisms (e.g., English, Dutch, Vickrey, Chinese, Double, Reverse auctions etc.). The various auction applications 44 may also provide a number of features in support of such auction-format listings, such as a reserve price feature whereby a seller may specify a reserve price in connection with a listing and a proxy-bidding feature whereby a bidder may invoke automated proxy bidding.

A number of fixed-price applications 46 support fixed-price listing formats (e.g., the traditional classified advertisement-type listing or a catalogue listing) and buyout-type listings. Specifically, buyout-type listings (e.g., including the Buy-It-Now (BIN) technology developed by eBay Inc., of San Jose, Calif.) may be offered in conjunction with an auction-format listing, and allow a buyer to purchase goods or services, which are also being offered for sale via an auction, for a fixed-price that is typically higher than the starting price of the auction.

Store applications 48 allow sellers to group their listings within a "virtual" store, which may be branded and otherwise personalized by and for the sellers. Such a virtual store may also offer promotions, incentives and features that are specific and personalized to a relevant seller.

Reputation applications 50 allow parties that transact utilizing the network-based marketplace 12 to establish, build and maintain reputations, which may be made available and published to potential trading partners. Consider that where, for example, the network-based marketplace 12 supports person-to-person trading, users may have no history or other reference information whereby the trustworthiness and credibility of potential trading partners may be assessed. The reputation applications 50 allow a user, for example through feedback provided by other transaction partners, to establish a reputation within the network-based marketplace 12 over time. Other potential trading partners may then reference such a reputation for the purposes of assessing credibility and trustworthiness.

Personalization applications 52 allow users of the marketplace 12 to personalize various aspects of their interactions with the marketplace 12. For example a user may, utilizing an appropriate personalization application 52, create a personalized reference page at which information regarding transactions to which the user is (or has been) a party may be viewed. Further, a personalization application 52 may enable a user to personalize listings and other aspects of their interactions with the marketplace 12 and other parties.

In one embodiment, the network-based marketplace 12 may support a number of marketplaces 54 that are customized, for example, for specific geographic regions. A version of the marketplace 12 may be customized for the United Kingdom, whereas another version of the marketplace 12 may be customized for the United States. Each of these versions may operate as an independent marketplace, or may be customized (or internationalized) presentations of a common underlying marketplace.

Navigation of the network based-marketplace 12 may be facilitated by one or more navigation applications 56. For example, a search application enables key word searches of listings published via the marketplace 12. A browse application allows users to browse various category, catalogue, or inventory data structures according to which listings may be classified within the marketplace 12. Various other navigation applications may be provided to supplement the search and browsing applications.

In order to make listings, available via the network-based marketplace 12, as visually informing and attractive as possible, the marketplace applications 30 may include one or more imaging applications 58 utilizing which users may upload images for inclusion within listings. An imaging application 58 also operates to incorporate images within viewed listings. The imaging applications 58 may also support one or more promotional features, such as image galleries that are presented to potential buyers. For example, sellers may pay an additional fee to have an image included within a gallery of images for promoted items.

Listing creation applications 60 allow sellers conveniently to author listings pertaining to goods or services that they wish to transact via the marketplace 12, and listing management applications 62 allow sellers to manage such listings. Specifically, where a particular seller has authored and/or published a large number of listings, the management of such listings may present a challenge. The listing management applications 62 provide a number of features (e.g., autorelisting, inventory level monitors, etc.) to assist the seller in managing such listings. One or more post-listing management applications 64 also assist sellers with a number of activities that typically occur post-listing. For example, upon completion of an auction facilitated by one or more auction applications 44, a seller may wish to leave feedback regarding a particular buyer. To this end, a post-listing management application 64 may provide an interface to one or more reputation applications 50, so as to allow the seller conveniently to provide feedback regarding multiple buyers to the reputation applications 50.

Dispute resolution applications 66 provide mechanisms whereby disputes arising between transacting parties may be resolved. For example, the dispute resolution applications 66 may provide guided procedures whereby the parties are guided through a number of steps in an attempt to settle a dispute. In the event that the dispute cannot be settled via the guided procedures, the dispute may be escalated to a third party mediator or arbitrator.

A number of fraud prevention applications 68 implement various fraud detection and prevention mechanisms to reduce the occurrence of fraud within the marketplace 12.

Messaging applications 70 are responsible for the generation and delivery of messages to users of the network-based marketplace 12, such messages for example advising users regarding the status of listings at the marketplace 12 (e.g., providing "outbid" notices to bidders during an auction process or to provide promotional and merchandising information to users).

Merchandising applications 72 support various merchandising functions that are made available to sellers to enable sellers to increase sales via the marketplace 12. The merchandising applications 80 also operate the various merchandising features that may be invoked by sellers, and may monitor and track the success of merchandising strategies employed by sellers.

Distributed feedback applications 81 support the creation, the maintenance, and the searching of feedback data records within a distributed feedback data database. Distributed feedback applications 81 perform all of the functions disclosed herein to permit these feedback data records to be created, stored within the database, and retrieved in response to search queries.

The network-based marketplace 12 itself, or one or more parties that transact via the marketplace 12, may operate loyalty programs that are supported by one or more loyalty/promotions applications 74. For example, a buyer may earn loyalty or promotions points for each transaction established and/or concluded with a particular seller, and be offered a reward for which accumulated loyalty points can be redeemed.

Data Structures

Figure 4:
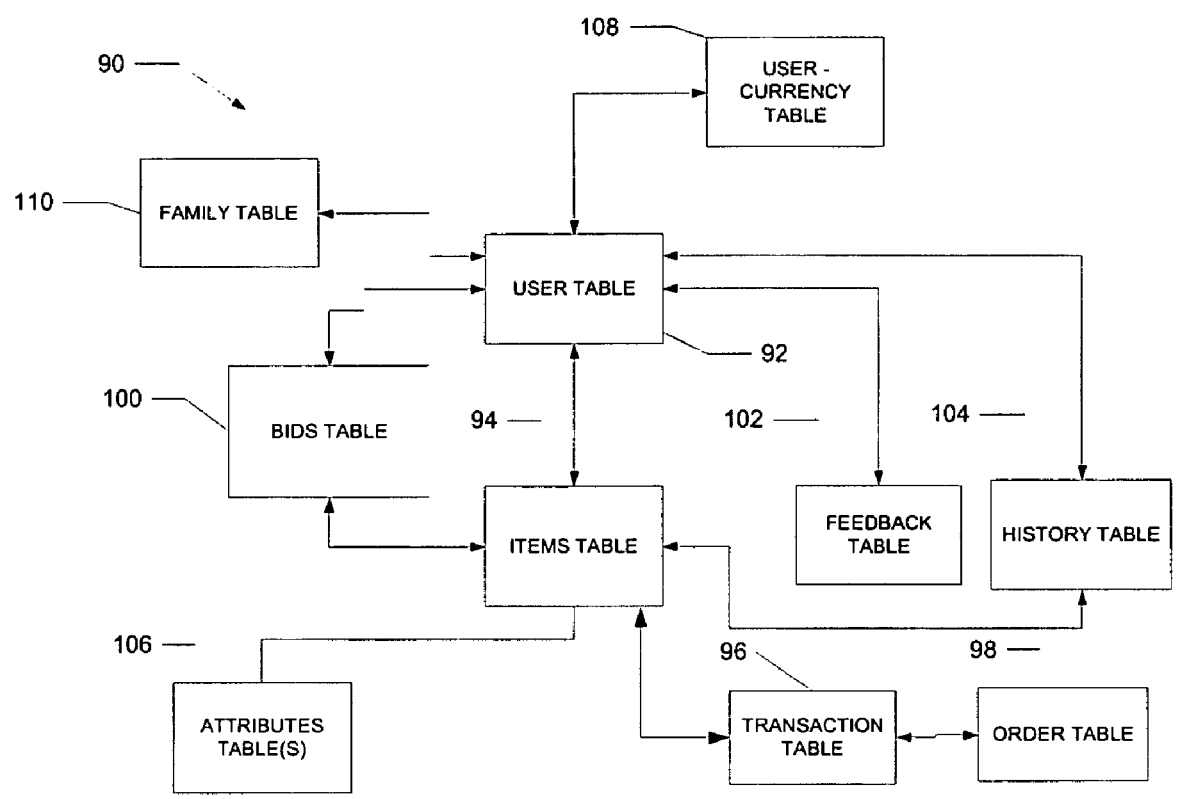
FIG. 4 is a high-level entity-relationship diagram in accordance with an example embodiment of the present invention.

FIG. 4 is a high-level entity-relationship diagram, illustrating various tables 90 that may be maintained within the databases 36, and that are utilized by and support the marketplace and payment applications 30 and 32. A user table 92 contains a record for each registered user of the network-based marketplace 12, and may include identifier, address and financial instrument information pertaining to each such registered user. A user may, it will be appreciated, operate as a seller, a buyer, or both, within the network-based marketplace 12. In one exemplary embodiment of the present invention, a buyer may be a user that has accumulated value (e.g., commercial or proprietary currency), and is then able to exchange the accumulated value for items that are offered for sale by the network-based marketplace 12.

The tables 90 also include an items table 94 in which are maintained item records for goods and services that are available to be, or have been, transacted via the marketplace 12. Each item record within the items table 94 may furthermore be linked to one or more user records within the user table 92, so as to associate a seller and one or more actual or potential buyers with each item record.

A transaction table 96 contains a record for each transaction (e.g., a purchase transaction) pertaining to items for which records exist within the items table 94.

An order table 98 is populated with order records, each order record being associated with an order. Each order, in turn, may be with respect to one or more transactions for which records exist within the transactions table 96.

Bid records within a bids table 100 each relate to a bid received at the network-based marketplace 12 in connection with an auction-format listing supported by an auction application 44. A feedback table 102 is utilized by one or more reputation applications 50, in one exemplary embodiment, to construct and maintain reputation information concerning users. A history table 104 maintains a history of transactions to which a user has been a party. One or more attributes tables 106 record attribute information pertaining to items for which records exist within the items table 94. Considering only a single example of such an attribute, the attributes tables 106 may indicate a currency attribute associated with a particular item, the currency attribute identifying the currency of a price for the relevant item as specified in by a seller. Family table 110 and user currency table 108 used to support related items and multiple currencies in transactions.

Figure 5:
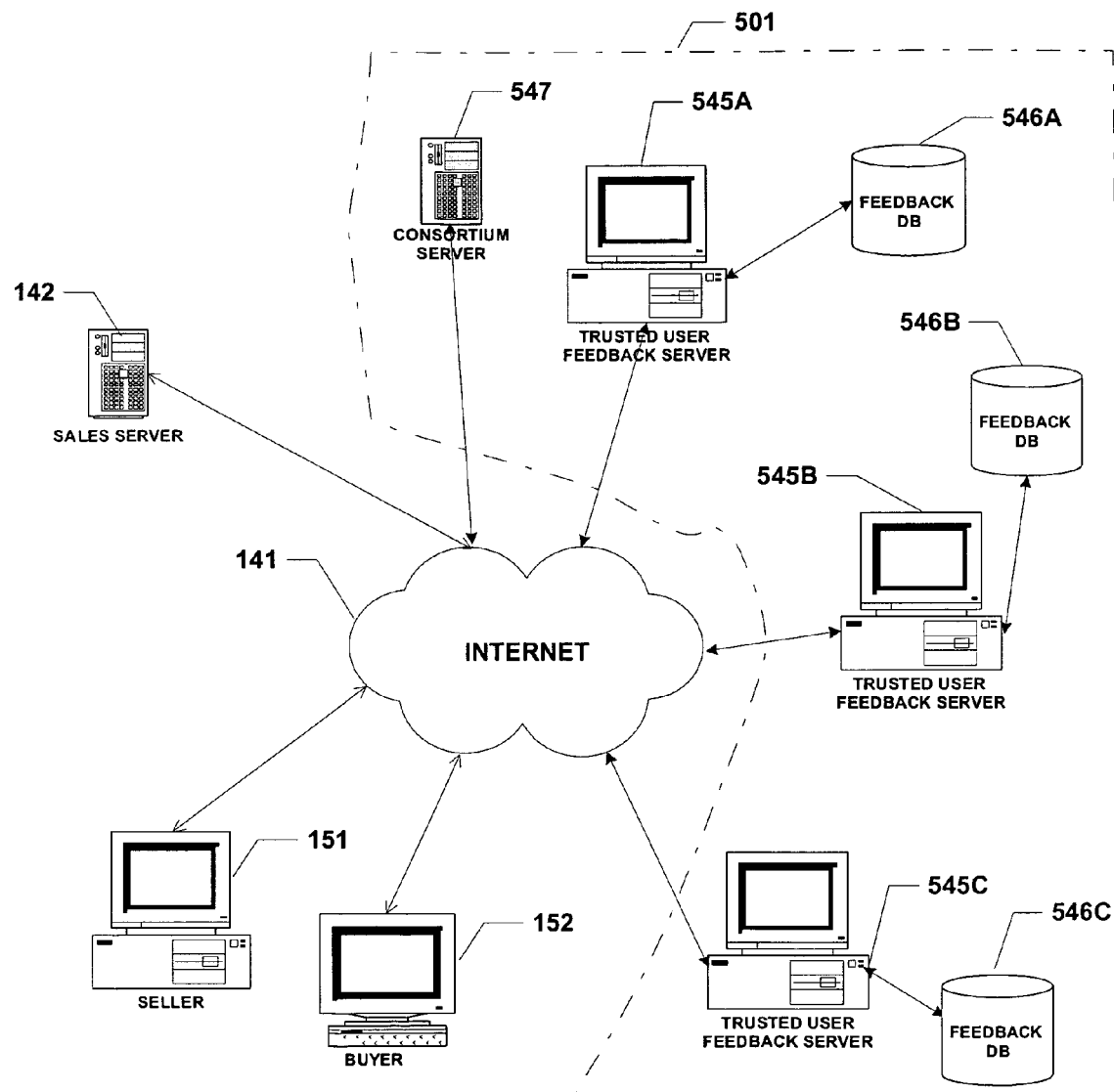
FIG. 5 is another network diagram depicting a system having a client-server architecture for an e-commerce system having a distributed feedback system in accordance with one exemplary embodiment of the present invention.

FIG. 5 is another network diagram depicting a system having a client-server architecture for an e-commerce system having a distributed feedback system 501 in accordance with one exemplary embodiment of the present invention. In this embodiment of the present invention, the set of feedback servers 545A-545C are constructed using processing systems from trusted users of commerce service platform 140. Rather than using computing resources provided from a central processing system, trusted users agree to cooperate together to provide these services collectively. A trusted user may be a buyer and seller in various individual transactions processed by sales server 142. The trusted user agrees to provide processing resources within its one of feedback servers 545A-545C to maintain the distributed feedback data database. Each of the feedback servers 545A-545C provides storage for its corresponding portion of the feedback data database 546A-546C.

Within the distributed feedback system 501, a consortium server 547 controls the overall operation of the set of trusted user feedback servers 545A-545C within the system 501. The consortium server 547 provides each of the trusted user feedback servers 545A-545C with approval to operate as a trusted user. The consortium server 547 maintains a mapping of feedback data records to each of the trusted user feedback servers 545A-545C. For example, each of the trusted user feedback servers 545A-545C may maintain a portion of the feedback data database 546A-546C based upon the user ID provided to identify the buyers and sellers. This mapping of feedback data records to each of the trusted user feedback servers 545A-545C may be a simple alphabetic division of the user IDs. Search queries and requests to add new feedback data records are transmitted to the appropriate one of the trusted user feedback servers 545A-545C using this mapping.

In alternate mappings, user IDs may be divided using a category system to describe the items offered for sale. For example, all feedback data records associated with a transaction for the sale of cameras may be stored within one of the trusted user feedback servers 545A-545C with all feedback data records associated with a transaction for the sale of portable music players may be stored within a different one of the trusted user feedback servers 545A-545C. In this embodiment, the trusted user for a particular category, such as cameras, may be seller of cameras.

Finally, the consortium server 547 provides overall system operation and control functionality. Part of this functionality is a specification of the anti-fraud checks that are performed upon requests to add feedback data records to the feedback data database. This specification defines a set of checks that have been agreed to be performed by all of the trusted user feedback servers 545A-545C. The consortium server 547 is operated by one or more interested users of the commerce service platform 140. All interested users may communicate with the consortium server 547 to participate in the coordination of the operation of the distributed feedback system 501. The consortium server 547 may be viewed in the same capacity of a moderator or administrator of a news group that operated in the Internet. The administrator performs operations to enforce community rules of behavior and prevent inappropriate actions of individual users. However, in most situations, the role of the administrator is passive until needed. In using such an administrative model, users of the commerce service platform 140 maintain control of the distributed feedback system 501 through the collective actions of the user community. Of course, other more hierarchical administrative models in which operators of the commerce service platform 140 maintain control of the distributed feedback system 501 may also be used.

Figure 6:
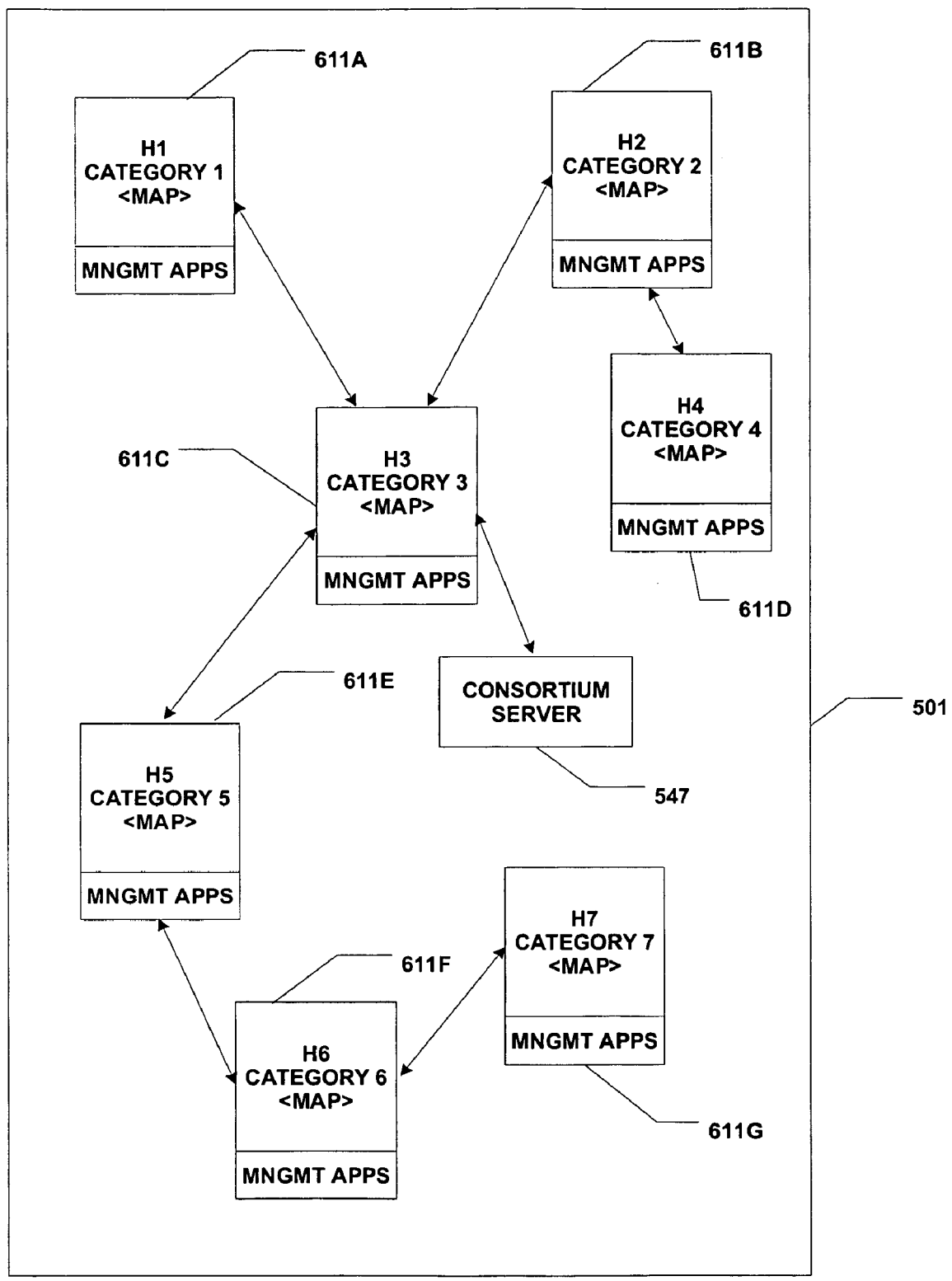
FIG. 6 is another network diagram for a peer-to-peer (P2P) distributed feedback system according to an exemplary embodiment of the present invention.

FIG. 6 is another network diagram for a P2P distributed feedback system according to an exemplary embodiment of the present invention. In this embodiment, the distributed feedback system 501 comprises a set of trusted user feedback servers 611A-611G that are connected together using a peer-to-peer (P2P) network. Consortium server 547 is also a node on the P2P network to provide a connection to all other of the trusted user feedback servers 611A-611G.

Buyers and sellers may connect to distributed feedback system 501 by attaching to any of the trusted user feedback servers 611A-611G as P2P nodes in the P2P network. The P2P network provides a communications path from each trusted user feedback servers 611A-611G to one or more of the trusted user feedback servers 611A-611G to create an interconnecting network between all nodes of the P2P network. Each of the trusted user feedback servers 611A-611G maintains a topology map of the network to identify the one or more nodes that contains feedback data useful in satisfying a search query. In an exemplary embodiment, users connect to one of the trusted user feedback servers 611A-611G as a P2P node and submit a search query for feedback data related to a particular seller. The one of trusted user feedback servers 611A-611G determines the one or more of the trusted user feedback servers 611A-611G containing the requested feedback data and forwards the request to those nodes. A response to the query is prepared by each of these trusted user feedback servers 611A-611G that is returned to the user. This arrangement may be successful because the trusted user feedback servers 611A-611G are typically expected to remain available to service search queries at all times; as such, the topology of the P2P network of trusted user feedback servers 611A-611G is not expected significantly over time.

In alternate embodiments, the search queries and requests to add feedback data records may be broadcast throughout the entire P2P network without significant reliance upon the topology map maintained by the nodes. Requests may be forwarded throughout the P2P network from nodes to all connected nodes in order for the request to propagate to all nodes in the network. Only trusted user feedback servers 611A-611G maintaining the feedback data which is the subject of the request respond to the request. This alternate embodiment is less efficient in that requests are forwarded throughout the network and are processed by additional nodes that ultimately take no action on the request. However, the alternate embodiment eliminates or reduces the need to maintain an accurate topology map of the P2P network as is may change over time.

Each of the trusted user feedback servers 611A-611G utilizes a set of management applications to perform its tasks of communicating with other nodes in the P2P network, responding to search queries for feedback data, maintaining its portion of the feedback data database, and determining whether a new feedback data record may be added to the feedback data database. These applications also communicate with the consortium server 547 to maintain the network topology map and the anti-fraud model used to identify improper feedback data records that are not to be added to the feedback data database.

Figure 7:
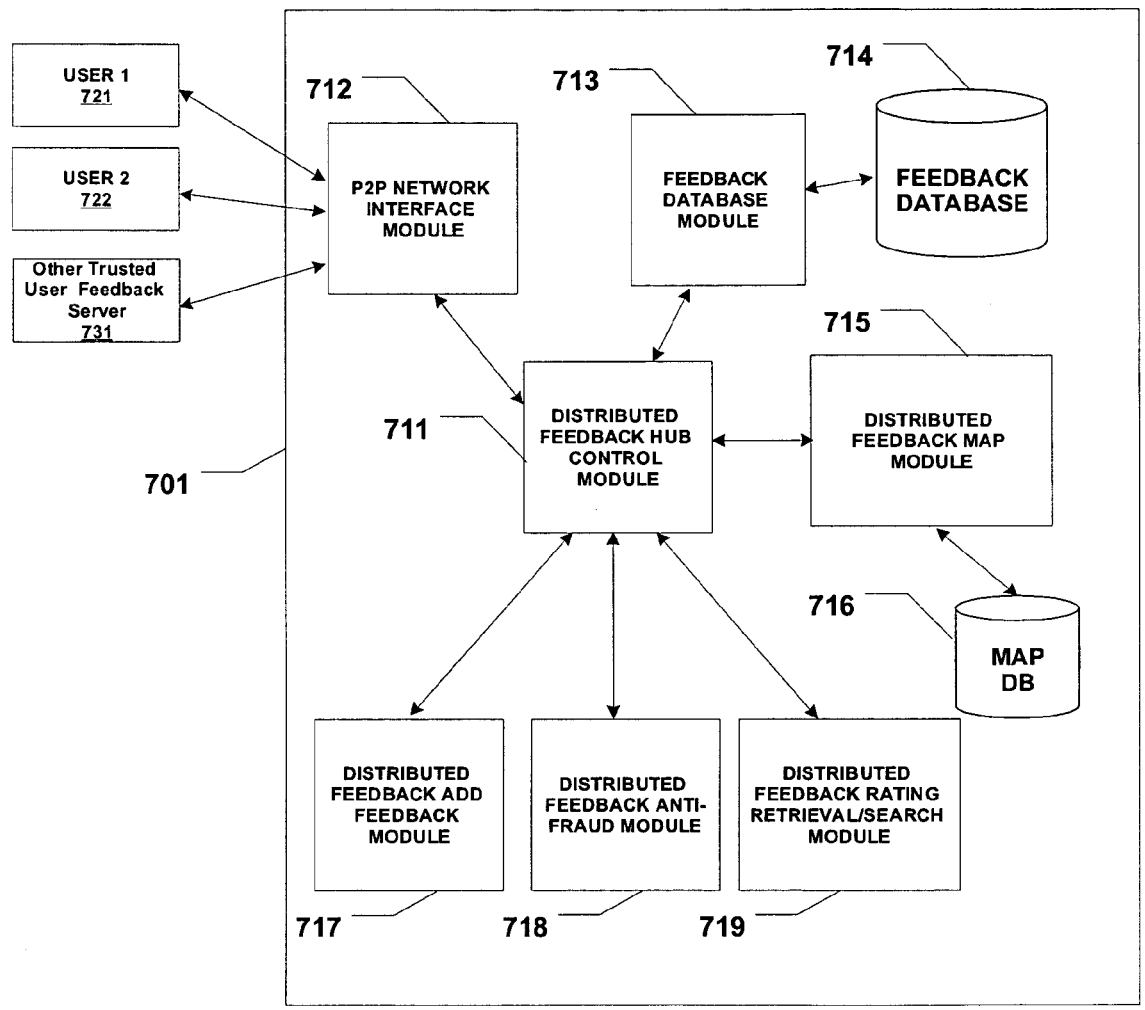
FIG. 7 is a block diagram of a set of processing modules for providing a P2P feedback data hub node within a P2P feedback network according to an exemplary embodiment of the present invention.

FIG. 7 is a block diagram of set of processing modules for providing a P2P feedback data hub node within a P2P feedback network according to an exemplary embodiment of the present invention. Each of the trusted user feedback servers 701 contains a set of processing modules to performs various functions. These processing modules include a distributed feedback hub control module 711, a P2P network interface module 712, a distributed feedback database module 713, a portion of the distributed feedback database 714, a distributed feedback map module 715, a distributed feedback map database 716, a distributed feedback add feedback module 717, a distributed feedback anti-fraud module 718, and a distributed feedback rating retrieval/search module 719.

The distributed feedback hub control module 711 performs all operations needed to coordinate the interaction of all of the other modules within trusted user feedback server 701. The P2P network interface module 712 provides a network connection to other nodes in the P2P network. These other nodes include consortium server 547, other trusted user feedback servers 731, and one or more users 721-722 connecting to trusted user feedback server 701 as P2P nodes to process feedback search queries and requests to add feedback data. P2P network interface module 712 routes incoming requests from users 721-722 to other modules in the trusted user feedback server 701 to service these requests. Response messages to these requests are returned through the P2P network interface module 712.

The distributed feedback database module 713 provides an interface module between processing modules within trusted user feedback server 701 and the corresponding portion of the distributed feedback database 714 maintained within trusted user feedback server 701. All database operations to search, add, delete, and maintain feedback database records within the corresponding portion of the distributed feedback database 714 are performed by distributed feedback database module 713.

The distributed feedback map module 715 provides an interface module between processing modules within trusted user feedback server 701 and the corresponding portion of the distributed feedback map database 716 maintained within trusted user feedback server 701. All database operations to search, add, delete, and maintain feedback database records within the P2P network topology data in the distributed feedback map database 716 are performed by distributed feedback map module 715. The distributed feedback map database 716 also maintains the mapping data associated with the categories and/or user IDs used to organize the distributed feedback database across all of the trusted user feedback servers 701.

The distributed feedback add feedback module 717, the distributed feedback anti-fraud module 718, and the distributed feedback rating retrieval/search module 719 perform the specific distributed feedback database data manipulation to feedback data records. Requests from users 721-722 to retrieve feedback data for a particular seller are processed within distributed feedback rating retrieval/search module 719. Distributed feedback rating retrieval/search module 719 determines that the data is expected to be found within the corresponding portion of the distributed feedback database 714 of trusted user feedback server 701. Distributed feedback rating retrieval/search module 719 utilizes network topology data from distributed feedback map database 716 as needed. Distributed feedback rating retrieval/search module 719 retrieves the feedback data records from the corresponding portion of the distributed feedback database 714 of trusted user feedback server 701 through the distributed feedback database module 713 to generate a response to the search query. This response is returned to users 721-722 through the P2P network interface module 712.

The distributed feedback add feedback module 717 receives requests from users 721-722 to add feedback data for a particular seller to the corresponding portion of the distributed feedback database 714 of trusted user feedback server 701. Distributed feedback add feedback module 717 determines that the data is expected to be found within the corresponding portion of the distributed feedback database 714 of trusted user feedback server 701. Distributed feedback add feedback module 717 utilizes network topology data from distributed feedback map database 716 as needed. Distributed feedback add feedback module 717 interacts with the distributed feedback anti-fraud module 718 to verify that the new feedback data record may be added to the corresponding portion of the distributed feedback database 714 of trusted user feedback server 701.

Distributed feedback add feedback module 717 adds the feedback data records into the corresponding portion of the distributed feedback database 714 of trusted user feedback server 701 through the distributed feedback database module 713. A response indicating the successful addition of the feedback data records is returned to users 721-722 through the P2P network interface module 712.

The distributed feedback anti-fraud module 718 implements a anti-fraud model used to determine if a user is attempting to inappropriately add feedback data to the distributed feedback data database. All users may interact with consortium server 547 and its operators to define various anti-fraud checks that are to be included within the anti-fraud model. The anti-fraud model is propagated throughout the P2P network of trusted user feedback servers for use in protecting the integrity of the feedback data.

The anti-fraud model is based upon a set of basic assumptions about the users, the transactions between buyers and sellers, and the feedback provided by the users. First, all users of the system are typically expected to identify themselves to the system. Typically, the users register their identity with the system by providing at least a network address, such as an e-mail address, where the user may be reached. Other network identifiers such as instant message ID, SMS ID, and other network identifier may also be used. Sellers, who typically benefit from a positive reputation gained from the feedback system, may be required to provide additional contact information such as an address, telephone number and contact individual for use by the system and its users. Buyers may also be required to provide additional identifying information and register in advance; this registration requirement is necessary for transactions made in an on-line auction system before buyers may place bids on items.

Transactions that are used to generate feedback are typically assigned a unique identifier. Feedback records are assumed to be generated in response to a particular transaction between a buyer and a seller. This unique identifier is typically used by these parties to identify the transaction as it is being made and completed. In the case of an on-line auction, the transaction unique identifier may be generated by the on-line auction when an item is listed. For a feedback system associated with sellers maintaining their own e-commerce web site, the transaction unique identifier may be generated by the seller when the transaction is generated in the web site.

The anti-fraud model compares known information about the buyer, the seller, the transaction, and the proposed feedback data record to determine whether the proposed feedback data records should be added to the distributed feedback data database. As part of these comparisons, various checks that are part of the approved anti-fraud model are performed. These checks may include any check that identify feedback data records expected to be fraudulent. For example, buyers and sellers may be banned from additional activity once the controlling consortium has determined that the user in question has violated rules of operation of the system. As such, feedback data records from banned users as identified by their buyer IDs and seller IDs are not added to the distributed feedback data database 714. Similarly, users from a known IP address that has generated fraudulent behavior may also be banned. Feedback data records also must accurately reference a valid transaction; thus the transaction ID provided as part of the proposed feedback data record may be checked for validity as part of the anti-fraud model.

More sophisticated checks may also be included within the anti-fraud model. For example, unscrupulous sellers may wish to generate fake feedback data to create a positive reputation without actually successfully completing valid transactions. With this fake positive reputation, these sellers may induce other buyers to enter into transactions. This type of fake feedback data may be generated by a seller who registers as a fake buyer to obtain a valid buyer IDs and uses fake transaction IDs that correspond to valid transaction ID numbers.

Additional anti-fraud checks may wish to check additional information associated with the buyer ID and/or the seller ID to determine the potential validity of the proposed feedback data record. For example, buyer IDs that have not previously generated feedback data records or have recently been created may be suspect. Buyer IDs that have only generated positive feedback data record for a particular seller ID may also be suspect. Positive feedback for a seller that is received at a pre-determined interval or following negative feedback from other buyers who have transaction records involving multiple sellers may also be suspect. The community of users, operating through the consortium and the consortium server 547, defines the conditions of factors which may identify the fraudulent feedback data records.

FIG. 8 is a block diagram of a feedback data database consisting of a collection of feedback data records according to an exemplary embodiment of the present invention. Feedback data database 801 is shown containing five different feedback data records 802A-802E. Each of these feedback data records 802A-802E contain data fields including a seller ID 811A-811E, a buyer ID 812A-812E, a transaction ID 813A-813E, a transaction feedback rating 814A-814E, and a transaction feedback comment 815A-815E. The seller ID 811A-811E and the buyer ID 812A-812E correspond to the unique identifiers for the parties to the transaction identified in transaction ID 813A-813E.

Transaction feedback rating 814A-814E field is used to provide an indication of a positive, negative and neutral transaction experience. This rating may provide any number of different rating values as desired by the feedback system. The transaction feedback rating 814A-814E also indicates whether the feedback corresponds to feedback directed to describe the buyer or the seller.

The comments field 815A-815E may be used to amplify and/or clarify a particular rating. For example, a buyer may provide a neutral rating value if a problem existed with the item sold by the seller but may wish to provide a detailed comment indicating how the seller addressed the problem. Similarly, the comment may provide a buyer and a seller information that while the transaction was successfully completed, the other party may be low to respond with payment and shipment of the item. All of this feedback data may be useful to parties to a subsequent transaction involving the buyer and seller.

When a request for feedback data on a particular seller is processed, the database 801 is searched for the seller's seller ID. For example, seller ID 1 is found within 3 records 802A, 802C and 802E in FIG. 8. Ratings from these records, if directed to seller ID 1, as opposed to the buyer, are accumulated to form the search query results returned to a requesting user. The details from the transaction feedback rating fields 814A, 814C and 814E as well as the corresponding comment fields 815A, 815C and 815E may also be included within the response.

In all of the above described embodiments, a transaction ID is assumed to be present for the feedback as the feedback data is typically expected to be used to describe reputation data associated with e-commerce transactions entered into over the Internet. One skilled in the art will recognize that similar systems that collect opinion data on topics of interest may also be constructed using a feedback system disclosed herein without departing from the spirit and scope of the present invention as recited within the attached claims. For example, the feedback collected and maintained within the distributed feedback data database may represent opinion data describing users reviews of recently released movies. In such a case, the rating field and comment fields provide similar feedback data relating to the reviewer's opinion of the movie. The seller ID and the buyer ID are used to identify the movie and the user providing the review data respectively. Because the data is only viewed as opinion data, the anti-fraud model may be less sophisticated than may be used in e-commerce transaction feedback systems. Otherwise the processing, storage and retrieval of the feedback data may operate in similar fashions.

Figure 9:
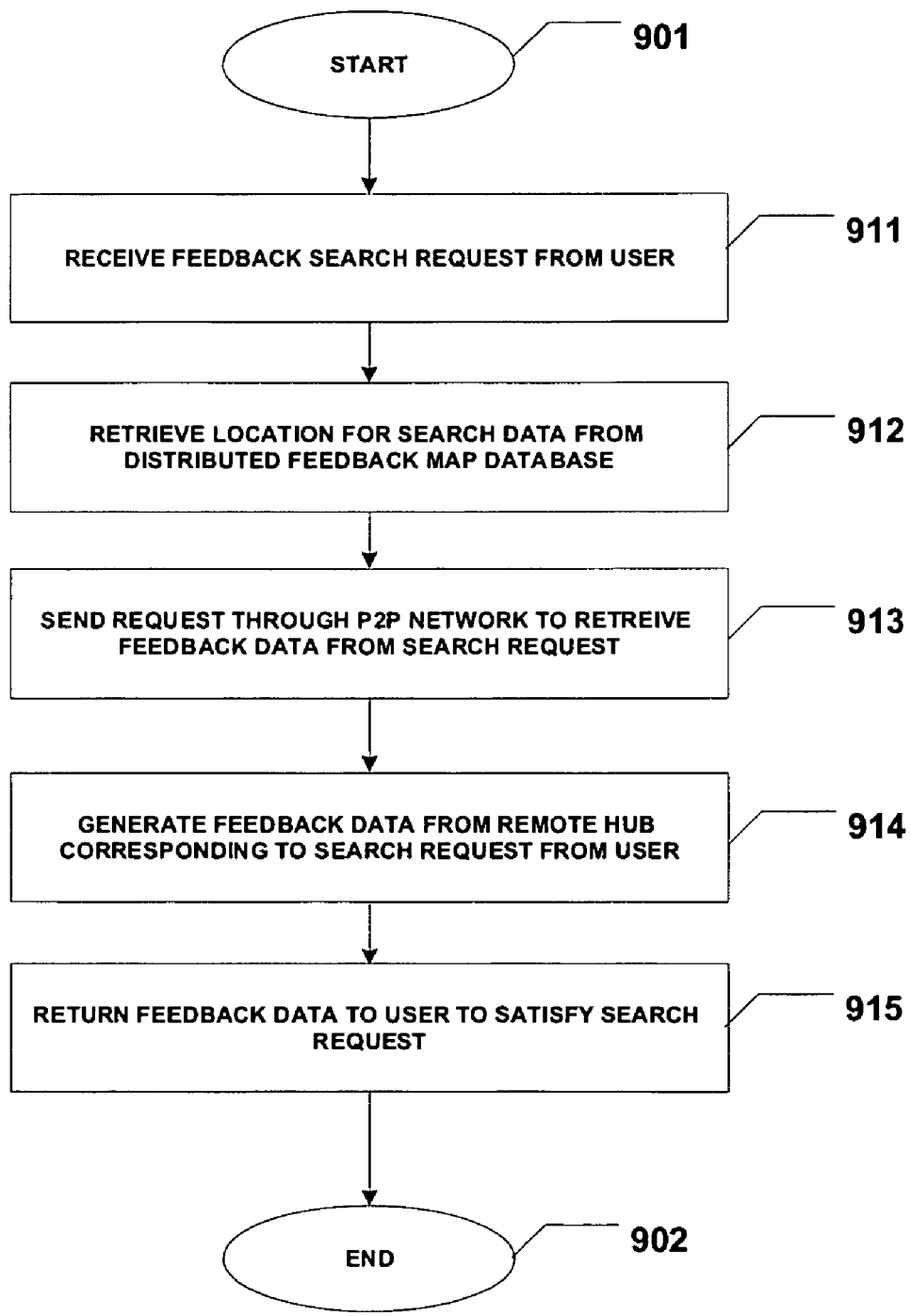
FIG. 9 is a flow diagram of a process to provide a user with accumulated feedback data in response to a search query according to an exemplary embodiment of the present invention.

FIG. 9 is a flow diagram of a process to provide a user with accumulated feedback data in response to a search query according to an exemplary embodiment of the present invention. The process of retrieving feedback data begins 901 when a search query request is received by a trusted user feedback server 701 from a user 721 in operation 911. Trusted user feedback server 701 retrieves the location within the P2P network for the trusted user feedback server 701 processing the feedback data for the incoming search query from the distributed feedback map database 716 in operation 912.

Once one or more of the trusted user feedback servers 701 that can service the search query have been identified, the search query is forwarded to these feedback servers for further processing in operation 913. Each of these one of trusted user feedback servers 701 processes the search query to obtain feedback data from the respective portions of the feedback data database 714 to generate a response in operation 914. Each of these one of trusted user feedback servers 701 returns the generated response data to user 721 to satisfy the search query in operation 915 before the process ends 902.

Figure 10:
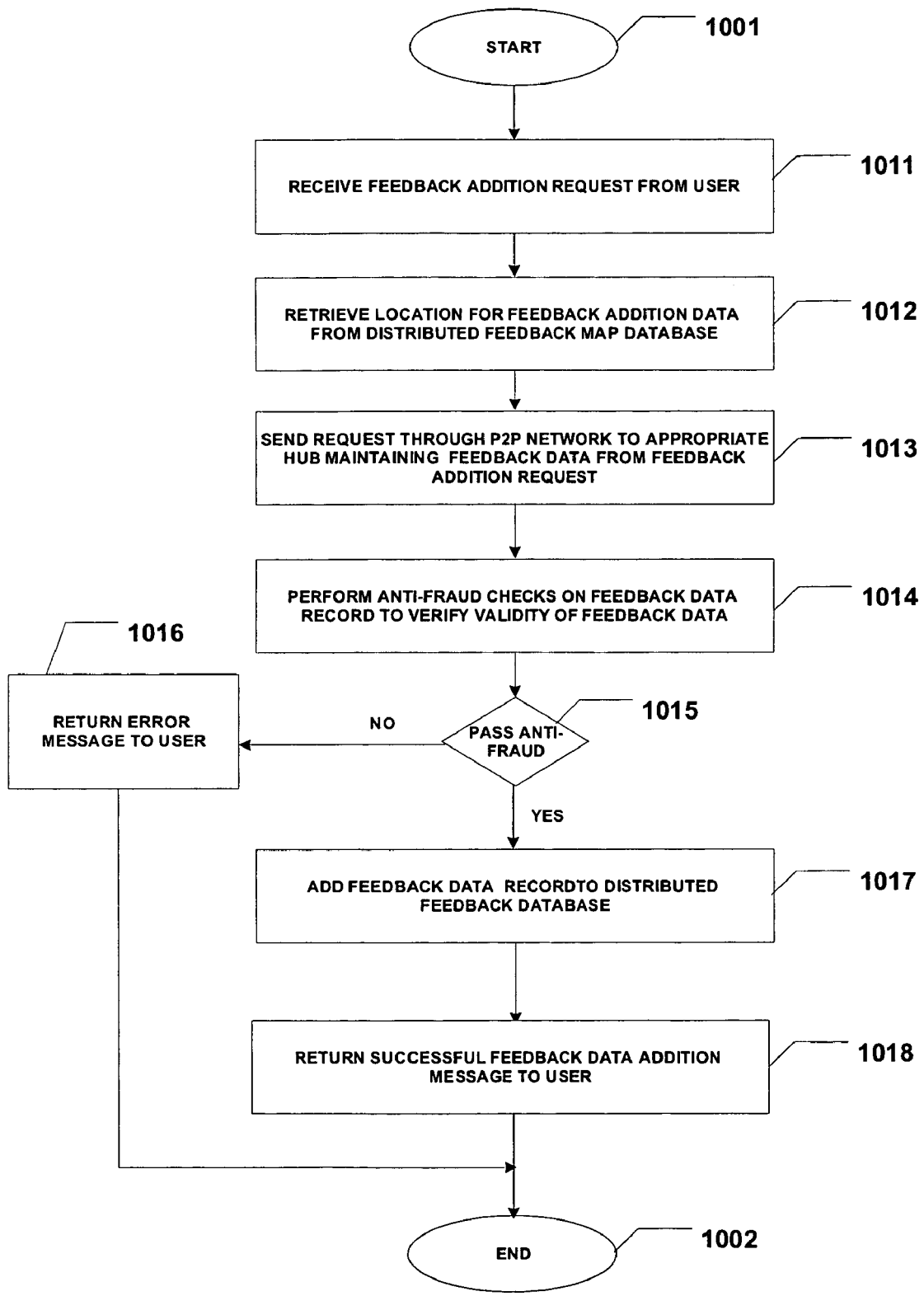
FIG. 10 is a flow diagram of a process to update a feedback data database with a new feedback data record corresponding to a transaction according to an exemplary embodiment of the present invention.

FIG. 10 is a flow diagram of a process to update feedback data database with a new feedback data record corresponding to a transaction according to an exemplary embodiment of the present invention. The process to add feedback data records to a feedback data database 714 begins 1001 when a request from a user 721 is received by one of trusted user feedback servers 701 in operation 1011. Trusted user feedback server 701 retrieves the location within the P2P network for the trusted user feedback server 701 processing the add feedback data records request from the distributed feedback map database 716 in operation 1012.

Once one or more of the trusted user feedback servers 701 that can service the search query have been identified, the add feedback data records request is forwarded to one or more of feedback servers for further processing in operation 1013. Each of the one or more of feedback servers processing the add feedback data records request applies the anti-fraud model in operation 1014 to determine whether the proposed feedback data record may be added to the feedback data database 914. Test operation 1015 determines whether the proposed feedback record may be added. If the proposed feedback data record may not be added, an error message is returned to the user 721 in operation 1016 and the processing ends.

If the proposed feedback data record may be added to the feedback data database 714, the record is added to the database 714 in operation 1017. The user 721 is informed of the successful addition of the feedback data record with a message generated in operation 1018 before the processing ends 1002.

Figure 11:
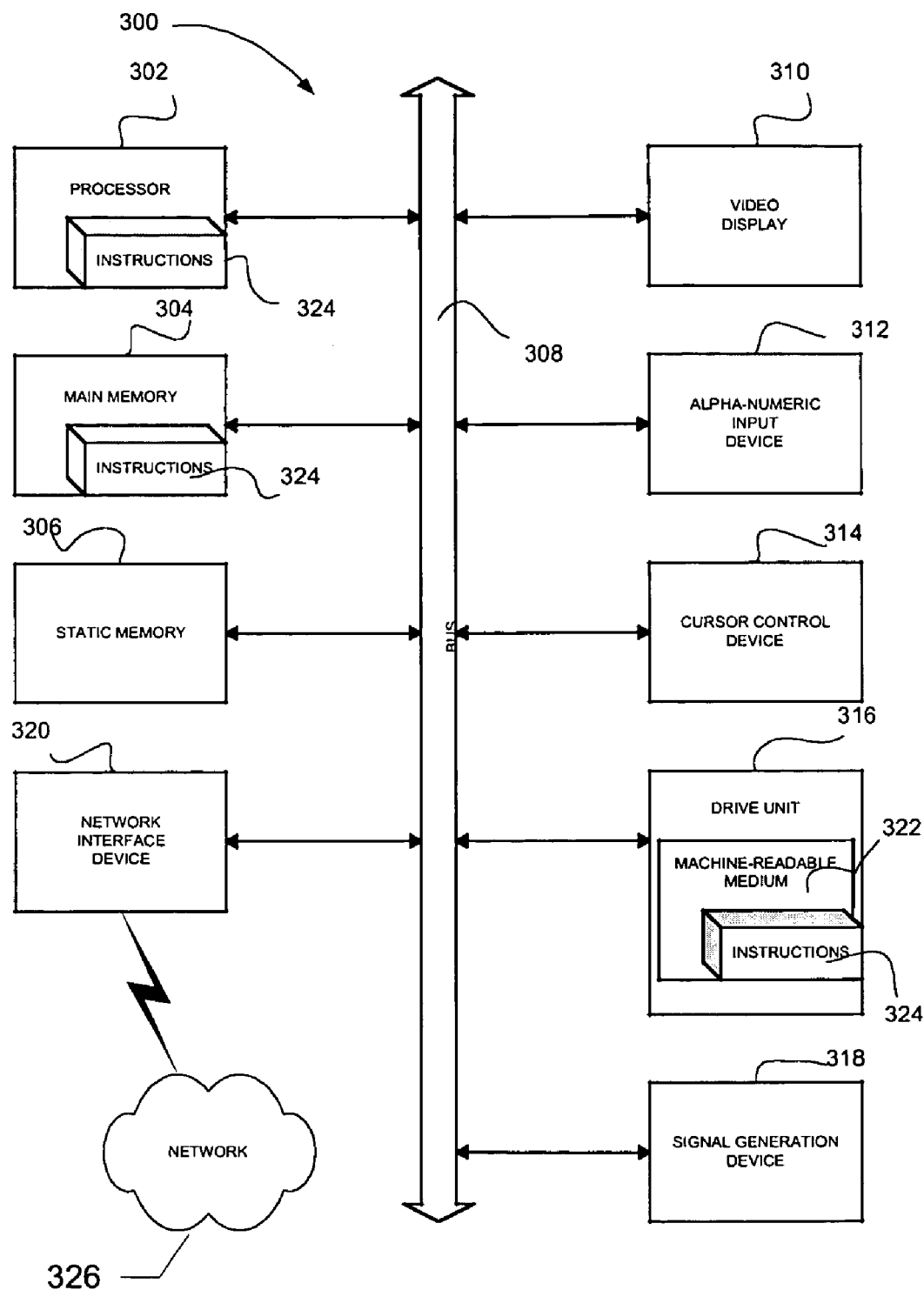
FIG. 11 is a block diagram illustrating a general programmable processing system for use in programmable processing system in accordance with various embodiments of the present invention.

FIG. 11 shows a diagrammatic representation of machine in the exemplary form of a computer system 300 within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a server computer, a client computer, a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 300 includes a processor 302 (e.g., a central processing unit (CPU) a graphics processing unit (GPU) or both), a main memory 304 and a static memory 306, which communicate with each other via a bus 308. The computer system 300 may further include a video display unit 310 (e.g., a liquid crystal display (LCD) or a cathode ray tube (CRT)). The computer system 300 also includes an alphanumeric input device 312 (e.g., a keyboard), a cursor control device 314 (e.g., a mouse), a disk drive unit 316, a signal generation device 318 (e.g., a speaker) and a network interface device 320.

The disk drive unit 316 includes a machine-readable medium 322 on which is stored one or more sets of instructions (e.g., software 324) embodying any one or more of the methodologies or functions described herein. The software 324 may also reside, completely or at least partially, within the main memory 304 and/or within the processor 302 during execution thereof by the computer system 300, the main memory 304 and the processor 302 also constituting machine-readable media. The software 324 may further be transmitted or received over a network 326 via the network interface device 320.

While the machine-readable medium 322 is shown in an exemplary embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention. The term "machine-readable medium" shall accordingly be taken to include, but not be limited to, solid-state memories, optical and magnetic media, and carrier wave signals.

Thus, a method and system to provide feedback data within a distributed feedback database of an e-commerce system have been described. Although the present invention has been described with reference to specific exemplary embodiments, it will be evident that various modifications and changes may be made to these embodiments without departing from the broader spirit and scope of the invention. Accordingly, the specification and drawings are to be regarded in an illustrative rather than a restrictive sense.

What is claimed is:

1. A system for providing feedback data to users within an e-commerce system, the system comprising:
    a peer-to-peer network of feedback servers; the feedback servers comprising:
        a feedback data database for storing a portion of a set of feedback data records;
        a feedback map database for storing a topography of the peer-to-peer network and a corresponding organization of the set of feedback data records; and
        a distributed feedback anti-fraud module for applying an anti-fraud model to determine whether proposed feedback data records may be added to the set of feedback data records;
    a consortium server for maintaining the anti-fraud module and for maintaining the topography of the peer-to-peer network and its corresponding organization of the set of feedback data records; and
    a plurality of user nodes connecting to the feedback servers to generate search query requests and requests to add feedback data records to the feedback data database.

2. The system according to claim 1, wherein the set of feedback data records describe a transaction between a buyer and a seller, each of the feedback data records comprises:
    a buyer ID field for uniquely identifying the buyer of the transaction;
    a seller ID field for uniquely identifying the seller of the transaction;
    a transaction ID field for uniquely identifying the transaction;
    a transaction feedback rating field for proving a rating describing the transaction; and
    a comments field for providing additional data describing the transaction.

3. The system according to claim 1, wherein the feedback servers further comprise:
    a distributed feedback add feedback module for adding feedback data records to the feedback data database; and
    a distributed feedback rating retrieval/search module for retrieving feedback data in response to a search query request.

4. The system according to claim 1, wherein the feedback servers are trusted user feedback servers operated by trusted buyers and trusted sellers of the system.

5. The system according to claim 1, wherein the feedback data records provide opinion data for items.

6. The system according to claim 1, wherein the consortium server is operated by a community of users.

7. A method for providing feedback data within an e-commerce system, the method comprising:
    receiving, by a first feedback server, a search query request for feedback data from a user;
    locating, by the first feedback server, one or more feedback servers within a peer-to-peer network of feedback servers to process the request;
    forwarding, by the first feedback server to a second feedback server, the search query request to the one or more feedback servers;
    generating, by the second feedback server, a response to the search query request; and
    returning, by the second feedback server to the user, a response to the search query request.

8. The method according to claim 7, wherein the locating the one or more feedback servers uses a feedback map database for storing a topography of the peer-to-peer network and its corresponding organization of a set of feedback data records.

9. The method according to claim 7, wherein the generating of the response uses a feedback data database for storing a portion of a set of feedback data records.

10. The method according to claim 9, wherein the set of feedback data records describe a transaction between a buyer and a seller, each of the feedback data records comprises:
    a buyer ID field for uniquely identifying the buyer of the transaction;
    a seller ID field for uniquely identifying the seller of the transaction;
    a transaction ID field for uniquely identifying the transaction;
    a transaction feedback rating field for proving a rating describing the transaction; and
    a comments field for providing additional data describing the transaction.

11. The method according to claim 7, wherein the feedback servers are trusted user feedback servers operated by trusted buyers and trusted sellers of the system.

12. The method according to claim 8, wherein the feedback data records provide opinion data for items.

13. A system for providing feedback data within an e-commerce system, the method comprising:
- a means for receiving a search query request for feedback data from a user;
- a means for locating one or more feedback servers within a peer-to-peer network of feedback servers to process the request;
- a means for forwarding the search query request to the one or more feedback servers;
- a means for generating a response to the search query request; and
- a means for returning a response to the search query request to the user.

14. The system according to claim 13, wherein the locating the one or more feedback servers uses a feedback map database for storing a topography of the peer-to-peer network and its corresponding organization of a set of feedback data records.

15. The system according to claim 13, wherein the generating a response uses a feedback data database for storing a portion of a set of feedback data records.

16. The system according to claim 15, wherein the set of feedback data records describe a transaction between a buyer and a seller, each of the feedback data records comprises:
- a buyer ID field for uniquely identifying the buyer of the transaction;
- a seller ID field for uniquely identifying the seller of the transaction;
- a transaction ID field for uniquely identifying the transaction;
- a transaction feedback rating field for proving a rating describing the transaction; and
- a comments field for providing additional data describing the transaction.

17. The system according to claim 13, wherein the feedback servers comprises:
- a feedback data database for storing a portion of a set of feedback data records;
- a feedback map database for storing a topography of the peer-to-peer network and its corresponding organization of the set of feedback data records; and
- a distributed feedback anti-fraud module for applying an anti-fraud model to determine whether proposed feedback data records may be added to the set of feedback data records;
- a distributed feedback add feedback module for adding feedback data records to the feedback data database; and
- a distributed feedback rating retrieval/search module for retrieving feedback data in response to a search query request.

18. The system according to claim 13, wherein the feedback servers are trusted user feedback servers operated by trusted buyers and trusted sellers of the system.

19. The system according to claim 13, wherein the feedback data records provide opinion data for items.

20. A machine-readable medium including a set on instructions that, when executed by a machine, cause of the machine to perform a method for providing feedback data within an e-commerce system, the method comprising:
- receiving, by a first feedback server, a search query request for feedback data from a user;
- locating, by the first feedback server, one or more feedback servers within a peer-to-peer network of feedback servers to process the request;
- forwarding, by the first feedback server to a second feedback server, the search query request to the one or more feedback servers;
- generating, by the second feedback server, a response to the search query request; and
- returning, by the second feedback server to the user, a response to the search query request.

21. The machine-readable medium of claim 20, wherein the locating the one or more feedback servers uses a feedback map database for storing a topography of the peer-to-peer network and its corresponding organization of a set of feedback data records.

22. The machine-readable medium of claim 20, wherein the generating a response uses a feedback data database for storing a portion of a set of feedback data records.

23. The machine-readable medium of claim 22, wherein the feedback data records describe a transaction between a buyer and a seller, each of the feedback data records comprises:
- a buyer ID field for uniquely identifying the buyer of the transaction;
- a seller ID field for uniquely identifying the seller of the transaction;
- a transaction ID field for uniquely identifying the transaction;
- a transaction feedback rating field for proving a rating describing the transaction; and
- a comments field for providing additional data describing the transaction.

24. The machine-readable medium of claim 20, wherein the feedback servers comprises:
- a feedback data database for storing a portion of a set of feedback data records;
- a feedback map database for storing a topography of the peer-to-peer network and its corresponding organization of the set of feedback data records; and
- a distributed feedback anti-fraud module for applying an anti-fraud model to determine whether proposed feedback data records may be added to the set of feedback data records;
- a distributed feedback add feedback module for adding feedback data records to the feedback data database; and
- a distributed feedback rating retrieval/search module for retrieving feedback data in response to a search query request.

25. The machine-readable medium of claim 20, wherein the feedback servers are trusted user feedback servers operated by trusted buyers and trusted sellers of the system.

26. The machine-readable medium of claim 21, wherein the feedback data records provide opinion data for items.

* * * * *